(12) United States Patent
Okada

(10) Patent No.: US 11,256,458 B2
(45) Date of Patent: Feb. 22, 2022

(54) IMAGE FORMING APPARATUS WITH A CONFIRMATION PRINTING FUNCTION AND A PRINTING TIMEOUT FUNCTION

(71) Applicant: CANON KABUSHIKI KAISHA, Tokyo (JP)

(72) Inventor: Hideyuki Okada, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 8 days.

(21) Appl. No.: 16/176,222

(22) Filed: Oct. 31, 2018

(65) Prior Publication Data

US 2019/0138252 A1 May 9, 2019

(30) Foreign Application Priority Data

Nov. 6, 2017 (JP) .............................. JP2017-213952

(51) Int. Cl.
*G06F 3/12* (2006.01)
(52) U.S. Cl.
CPC .............. *G06F 3/126* (2013.01); *G06F 3/121* (2013.01); *G06F 3/1235* (2013.01); *G06F 3/1253* (2013.01); *G06F 3/1285* (2013.01)
(58) Field of Classification Search
None
See application file for complete search history.

(56) References Cited

U.S. PATENT DOCUMENTS

| 8,717,598 | B2 | 5/2014 | Okada |
| 9,651,909 | B2 | 5/2017 | Okada |
| 9,898,233 | B2 | 2/2018 | Kuroda |
| 9,917,973 | B2 | 3/2018 | Okada |
| 10,114,596 | B2 * | 10/2018 | Kashiwagi ............ G06F 3/1204 |

(Continued)

FOREIGN PATENT DOCUMENTS

| CN | 105467791 A | 4/2016 |
| EP | 1 806 651 A2 | 11/2007 |

(Continued)

OTHER PUBLICATIONS

Chinese Office Action dated Jun. 23, 2021, in related Chinese Patent Application No. 201811314408.0 (with English translation).

(Continued)

*Primary Examiner* — Eric A. Rust
(74) *Attorney, Agent, or Firm* — Venable LLP

(57) ABSTRACT

An image forming apparatus includes a receiver that receives a first job and a second job in that order, and a controller that suspends, in a case where a predetermined condition for execution of the first job is not satisfied, execution of the first and the second jobs. The controller starts, if it is determined that the first job is a job specified to require the user confirmation for execution of the job, execution of the suspended second job in response to an elapse of a predetermined time period in a state that the predetermined condition is not satisfied, and the controller does not start, if it is determined that the first job is the job specified to require the user confirmation for execution of the job and the predetermined time period elapses in a state that the predetermined condition is not being satisfied, execution of the second job.

7 Claims, 23 Drawing Sheets

(56) References Cited

U.S. PATENT DOCUMENTS

| | | | |
|---|---|---|---|
| 10,877,416 B2 | 12/2020 | Okada | |
| 2009/0097064 A1 | 4/2009 | Tominaga | |
| 2011/0235108 A1* | 9/2011 | Kato | H04N 1/00899 358/1.15 |
| 2014/0132976 A1 | 5/2014 | Csurka et al. | |
| 2014/0376023 A1* | 12/2014 | Anno | G06K 15/4065 358/1.14 |
| 2015/0043035 A1* | 2/2015 | Iida | G06K 15/002 358/1.15 |
| 2017/0090840 A1* | 3/2017 | Hardikar | G06F 3/1292 |
| 2017/0109107 A1* | 4/2017 | Kuroda | G06F 3/121 |

FOREIGN PATENT DOCUMENTS

| | | |
|---|---|---|
| JP | H11-321039 A | 11/1999 |
| JP | 2001-047697 A | 2/2001 |
| JP | 2002-321429 A | 11/2002 |
| JP | 2005-104614 A | 4/2005 |
| JP | 2005-121892 A | 5/2005 |
| JP | 101414248 | 4/2009 |
| JP | 2009-096007 A | 5/2009 |
| JP | 2010-277311 A | 12/2010 |
| JP | 2013-237205 A | 11/2013 |
| JP | 2017-065223 A | 4/2017 |
| JP | 2017-074698 A | 4/2017 |

OTHER PUBLICATIONS

Japanese Office Action dated Oct. 5, 2021, in related Japanese Patent Application No. 2017-213952.

Chinese Office Action dated Dec. 21, 2021, in related Chinese Patent Application No. 201811314408.0.

* cited by examiner

301 TOUCH PANEL UNIT

302 HARD KEY INPUT UNIT

Copy | Transmit | Box | Extend

Auto color selection
You can copy.

100% | same size | magnification

Auto sheet | sheet selection double-sided | sorter auto | character/photo/map applied mode interrupt | system situation screen contrast
counter
power save
help
user mode 1 2 3 C
4 5 6
7 8 9
* 0 # ID

ON/OFF

Basic setting | Page setting | Finish | Sheet feed | Print quality

Favorite (F):

Output method (M): printing

Specification method of sheet (B)  Add (1)...  Edit (2)...

○ specify by sheet feed unit
○ specify by sheet type print all pages on the same sheets — 601

Sheet feed method (S):

Sheet feed unit (E): manual feed tray

☑ use confirmation printing mode. — 602

Job comment: — 603

A4 (magnification: auto)

Device preview (W)

Check setting (V)

information on sheet feed unit (I)..

setting of cover/back cover (K)..

OK    Cancel    Apply (A)    Return to standard (R)    Help

Confirmation printing mode

Check the sheet and press down [OK]. Printing will start.

- ▲ sheet necessary for printing
  - A4
  - plain sheet 1 (64~81g/m2)

- ▲ information on sheet being selected

700

701

Abort | Close | OK printer | Check the manually fed sheet

FIG.8

| FIG.8A |
|--------|
| FIG.8B |

FIG.8A

MAIN CONTROL FLOW START

S801 DETERMINE TOP JOB WITHIN PRINT QUEUE AS PROCESSING-TARGET JOB

S802 ACQUIRE PRINT SETTING INFORMATION ON PROCESSING-TARGET JOB

S803 USE-TARGET SHEET FEED UNIT DETERMINATION PROCESSING

S804 BEFORE-PRINT-START CHECK PROCESSING

S805 IS THERE TEMPORARY SUSPENSION FACTOR?
 — NO → (loop back)
 — YES ↓

S806 TEMPORARILY SUSPEND PRINTING

S807 IS "Confirmation processing" INCLUDED IN TEMPORARY SUSPENSION FACTORS?
 — NO → S809 START COUNTDOWN OF TIMEOUT
 — YES ↓

S808 RECEPTION PROCESSING OF INSTRUCTIONS TO CONTINUE PRINTING

| | Copy/print | Transmit | Receive | Save | Consumables/others |
|---|---|---|---|---|---|

Job situation | Job history | print ▶

| Time | Job name | User name | Situation | Wait time (about) |
|---|---|---|---|---|
| 19:19 | ○○○report 1 | User1 | wait for instructions to perform printing | less than 1 min |
| 19:20 | ○○○report 2 | User2 | wait for print | less than 1 min |
| 19:20 | ○○○report 3 | User3 | wait for print | |

Interrupt/priority print | Detailed information ▲ | Abort

Close

There is a job on standby for printing, which needs instructions to start printing.

910, 911, 912, 913, 904

| | Copy/ print | Transmit | Receive | Save | Consumables/ others |
|---|---|---|---|---|---|

Job situation     Job history     print ▶

| Time | Job name | User name | Situation | Wait time (about) |
|---|---|---|---|---|
| 19:20 | ◇ ○○○report 2 | User2 | during print | less than 1 min |
| 19:19 | ◇ ○○○report 1 | User1 | being held | ——min |
| 19:20 | ◇ ○○○report 3 | User3 | wait for print | less than 1 min |

Detailed information ▲    Abort

Interrupt/priority print

Close ↙

There is an aborted job due to no sheet, which needs resumption processing.

<Timeout at the time of abort of job> 1001

ON ▲ | OFF 5 min
(0~999)

− | +

1002

Operation at the time of timeout:
● Cancel the aborted job.
○ Bring the aborted job into a suspended state and promote and print the subsequent job.

1003
1004

✕ Cancel | ↵ OK 1005

FIG.11

```
                    ┌─────────────────────┐
                    │ BEFORE-PRINT-START  │
                    │  CHECK PROCESSING   │
                    │       START         │
                    └──────────┬──────────┘
                               │      S1201
                          ╱────┴────╲
                     ╱   DO SHEET TYPE   ╲
                ╱ SPECIFIED IN PROCESSING-TARGET ╲  YES
               ╱ JOB AND SHEET TYPE SET TO USE-TARGET ╲──────┐
               ╲  SHEET FEED UNIT MATCH WITH          ╱      │
                ╲           EACH OTHER?              ╱       │
                     ╲                         ╱             │
                          ╲────┬────╱                        │
                               │ NO                          │
                    ┌──────────┴──────────┐                  │
                    │ RECOGNIZE TEMPORARY │  S1202           │
                    │  SUSPENSION FACTOR  │                  │
                    │ (SHEET TYPE MISMATCH)│                 │
                    └──────────┬──────────┘                  │
                               │◄─────────────────────────────┘
                               │      S1203
                          ╱────┴────╲     NO
                     ╱   IS SHEET SET  ╲─────────┐
                    ╱   IN USE-TARGET   ╲        │
                    ╲    FEED UNIT?     ╱        │
                     ╲                 ╱   ┌─────┴──────────────┐
                          ╲────┬────╱      │RECOGNIZE TEMPORARY │ S1204
                               │ YES       │ SUSPENSION FACTOR  │
                               │           │     (NO SHEET)     │
                               │           └─────┬──────────────┘
                               │◄────────────────┘
                               │      S1205
                          ╱────┴────╲     YES
                     ╱      IS      ╲─────────┐
                    ╱  CONFIRMATION  ╲        │
                    ╲   PRINTING     ╱        │
                     ╲   MODE SET?  ╱   ┌─────┴──────────────┐
                          ╲────┬────╱   │RECOGNIZE TEMPORARY │ S1206
                               │ NO     │ SUSPENSION FACTOR  │
                               │        │(CONFIRMATION PRINTING)│
                               │        └─────┬──────────────┘
                               │◄─────────────┘
                               │      S1207
                          ╱────┴────╲
                     ╱     DOES     ╲  YES
                    ╱ ANOTHER TEMPORARY╲─────────┐
                    ╲ SUSPENSION FACTOR╱         │
                     ╲    EXIST?     ╱    ┌──────┴──────────────┐
                          ╲────┬────╱     │ RECOGNIZE TEMPORARY │ S1208
                               │ NO       │ SUSPENSION FACTOR IN│
                               │          │ ACCORDANCE WITH CAUSE│
                               │          └──────┬──────────────┘
                               │◄────────────────┘
                          ┌────┴─────┐
                          │  RETURN  │
                          └──────────┘
```

FIG.12

```
          ┌─────────────────────────┐
          │  DISPLAY CONFIRMATION   │
          │ PROCESSING MODE SCREEN  │
          │         START           │
          └───────────┬─────────────┘
                      ▼
          ┌─────────────────────────┐
          │  DISPLAY CONFIRMATION   │─── S1301
          │ PROCESSING MODE SCREEN  │
          └───────────┬─────────────┘
                      ▼  S1302
                    ╱   ╲
                  ╱       ╲  NO (NO OPERATION)
       ╱HAVE INSTRUCTIONS TO╲─────────────────┐
      ╱ CONTINUE PRINTING    ╲                │
      ╲ BEEN RECEIVED        ╱                │
       ╲ FROM USER?         ╱                 │
         ╲     YES        ╱  S1303            │  S1304
           ╲    │       ╱                     │
            ▼───┘                             ▼
  ┌─────────────────────────┐     ┌─────────────────────────┐
  │  CANCEL TEMPORARY       │     │  PERFORM ERROR PROCESSING│
  │  SUSPENSION FACTOR      │     │                          │
  │ (CONFIRMATION PROCESSING)│    └────────────┬─────────────┘
  └───────────┬─────────────┘                  ▼
              ▼                              ( END )
          ( RETURN )
```

FIG.13

```
                    ┌─────────────────────┐
                    │ RECOVERY PROCESSING │
                    │       START         │
                    └─────────┬───────────┘
                              │
                    ┌─────────▼─────────────┐
                    │ DISPLAY RECOVERY UI   │   S1401
                    │ SCREEN IN ACCORDANCE  │
                    │ WITH TEMPORARY        │
                    │ SUSPENSION FACTOR     │
                    └─────────┬─────────────┘
```

S1402 IS REPLENISHED OR THE NECESSARY SETTING OF THE SHEET SIZE/SHEET TYPE IS PERFORMED?
— NO → (loop back)
— YES ↓

S1403 DO SHEET SIZE/SHEET TYPE SPECIFIED IN PROCESSING-TARGET JOB AND SHEET SIZE/SHEET TYPE SET TO USE-TARGET SHEET FEED UNIT MATCH WITH EACH OTHER?
— NO → (loop back)
— YES ↓

S1404 CANCEL TEMPORARY SUSPENSION FACTOR (SHEET SIZE MISMATCH, SHEET TYPE MISMATCH, NO SHEET)

S1405 IS ANOTHER TEMPORARY SUSPENSION FACTOR CLEARED?
— NO → RETURN
— YES ↓

S1406 CANCEL TEMPORARY SUSPENSION FACTOR IN ACCORDANCE WITH FACTOR

RETURN

There is no A4 sheet of optimum size.
Select another sheet and press [OK], then, print will start.

sheet necessary for print
A4 information on sheet being selected
A3
plain sheet 1 (64~75g/m2)

1 A3
2 A3
3 A3
4 A3
5 LTR manual feed

Abort | Close | OK printer — Check situation/check abort screen

FIG.15B

<Setting of sheet>

| 1 A3 | 2 A3 | 3 A3 | 4 A3 | 5 LTR | setting ▲
size set by user ▲
envelope ▲

OK

■ information on sheet being selected
▲ A3    plain sheet1(64~75g/m2)

<Setting of sheet : sheet type>
Select sheet type.

| thin sheet 2 (52~59g/m2) | thin sheet 1 (60~63g/m2) | plain sheet 1 (64~75g/m2) | plain sheet 2 (76~90g/m2) |
| plain sheet 3 (91~105g/m2) | thick sheet 1 (106~128g/m2) | thick sheet 2 (129~150g/m2) | thick sheet 3 (151~163g/m2) |
| thick sheet 4 (164~180g/m2) | thick sheet 5 (181~220g/m2) | thick sheet 6 (221~256g/m2) | OHP film |
| recycled sheet 1 (64~75g/m2) | | punched sheet | color sheet (64~81g/m2) |

To detailed setting

× Cancel   ↵ OK

<Setting of sheet : sheet size>

A5 | A4 | A3 | B5 | B4 | LTR

Cancel | OK

FIG.16C

IMAGE FORMING APPARATUS WITH A CONFIRMATION PRINTING FUNCTION AND A PRINTING TIMEOUT FUNCTION

BACKGROUND OF THE INVENTION

Field of the Invention

The present invention relates to execution control of a print job in an image forming apparatus.

Description of the Related Art

Recent image forming apparatuses include a variety of sheet feed units, such as a plurality of cassettes and a manual feed tray, and it is possible to perform printing by selecting a sheet to use from a plurality of kinds of sheets without the need to exchange sheets each time. However, even though the above-described plurality of sheet feed units is provided, it is difficult to satisfy each of a variety of needs of a user. Because of this, in many cases, the sheet feed unit is used in accordance with uses or purposes in such a manner that the sheet feed cassette is used for the sheet whose frequency of use is high and the sheet a large number of which is used at a time, and the manual feed tray is used for the sheet whose frequency of use is low and the preprint sheet dedicated to specific printed matter. Further, in the case where it is made possible to create printed matter using a plurality of sheets different in sheet size and sheet type while using a plurality of sheet feed units as described above, the time and effort to grasp which sheet is set in which sheet feed unit are required and it becomes necessary to perform complicated sheet setting at the time of generating a print job. Consequently, there are also many image forming apparatuses having a function to automatically select an optimum sheet feed unit based on information on sheet setting included in a print job. Due to this, by a user specifying in advance the size and type of a sheet that the user uses in a print job, an optimum sheet feed unit is selected by the image forming apparatus and printing is performed without the need for the user to take into consideration the setting on the sheet feed unit side.

In an environment in which the image forming apparatus such as described above is shared and used by a plurality of users (for example, in an office and the like), there is a case where the sheet prepared and set by a user is used by another user. As the cause of this, in addition to misunderstanding and erroneous operation, for example, there may be a case where a plurality of print jobs is queued and the rest of the sheet used in the preceding print job is also used in the subsequent print job by the automatic selection processing of the sheet feed unit described previously. In such a situation, there may occur a case where the sheet is already used and it is no longer possible to perform printing even though a user who has set the sheet inputs a print job. Regarding this point, for example, Japanese Patent Laid-Open No. 2005-104614 has proposed a technique to temporarily suspend printing immediately before sheet feed at the time of a sheet being fed from a specific sheet feed unit specified by a user and to cause a user to confirm whether to continue printing processing (hereinafter, called "confirmation printing function"). According to the technique of Japanese Patent Laid-Open No. 2005-104614, a confirmation operation is performed without exception before a sheet is fed, and therefore, it is possible to avoid the occurrence of such a problem that it is not possible to perform printing because there is no sheet. Further, Japanese Patent Laid-Open No. 2005-104614 has also proposed to display an arbitrary message at the time of causing a user to confirm whether to continue printing processing. Due to this, it is made possible for a user to determine whether or not the suspended print job is the print job of the user.

Further, there is a case where execution of a print job is suspended by regarding the state as a so-called out-of-sheet (no sheet) state because all the sheets are used on the way during printing processing or the necessary sheet is not set originally in the sheet feed unit. In such a case, usually, by a user who has input the print job noticing that there is no sheet and replenishing the necessary sheet, the printing processing is resumed. However, in the case where a user who has input the suspended print job does not notice that there is no sheet or the state is such that it is not possible to immediately perform replenishment, the suspended state of printing processing is left as it is. In this case, it is not possible to perform printing processing of another queued print job (subsequent print job), which can be printed with the sheet currently set in the image forming apparatus and the printing processing stagnates. Then, in an environment in which a plurality of users shares and uses the image forming apparatus, it is not possible to simply cancel the suspended print job of another user, and therefore, this leads to stagnation of business.

Consequently, there exists an image forming apparatus having a function to perform control so as to perform a subsequent print job first (overtaking printing) with an elapse of a predetermined time as a trigger in the case where execution of a print job is suspended for some reason and the situation is brought about in which execution of subsequent print jobs is impeded. Such a function is called a timeout function. By this timeout function, the print job put into the suspended state is cancelled or put into the held state so that it is possible to resume the printing processing later. By doing so, even in the case where some print job is left in the suspended state, it is possible to avoid the occurrence of such a situation in which it is not at all possible to use the image forming apparatus and business stagnates.

Here, also in the state where printing processing is temporarily suspended by the confirmation printing function described previously, execution of a subsequent print job is postponed. Consequently, in the case where a user leaves a job of confirmation printing as it is without performing any action, such as giving instructions to continue printing, it is not at all possible to perform printing processing using the image forming apparatus. However, in a situation in which printing processing is suspended temporarily by the confirmation printing function, in the case where overtaking of a subsequent print job is performed, or the suspended print job is cancelled by the timeout function described previously, such a new problem as follows may arise. Specifically, in the case where a comparatively short time is set as the timeout time, there is a case where printing processing of a subsequent print job is started before a user confirms the sheet and gives instructions to continue printing, or the suspended print job is cancelled. In particular, in the case where the timeout function is made ineffective (or the timeout time is set to 0 sec), a timeout occurs immediately after the job of confirmation printing suspends temporarily to confirm whether or not to continue printing, and therefore, the confirmation printing function itself is no longer effective.

Consequently, an object of the present invention is to make an attempt to cause the timeout function and the confirmation printing function to coexist.

SUMMARY OF THE INVENTION

The image forming apparatus according to the present invention is an image forming apparatus configured to execute print jobs in order of input, the image forming apparatus including: control unit configured to, in a case where a target print job does not satisfy a condition necessary for execution and the target print job is not a print job which has been specified as requiring user confirmation for execution to start, suspend execution of the target print job and a subsequent print job that follows the target print job, and start execution of the subsequent print job in accordance with an elapse of a first time period set in advance in a state where the condition is not satisfied, wherein the control unit, in a case where the target print job is a print job which has been specified as requiring user confirmation for execution to start and the condition necessary for execution of the target print job is not satisfied, is configured to suspend execution of the target print job and the subsequent print job and not to start execution of the subsequent print job in accordance with an elapse of the first time period in a state where the condition is not satisfied.

Further features of the present invention will become apparent from the following description of exemplary embodiments with reference to the attached drawings.

BRIEF DESCRIPTION OF THE DRAWINGS

FIG. 1 is a diagram showing an example of a configuration of an image forming system;

FIG. 2 is a block diagram showing a main hardware configuration of an MFP;

FIG. 3 is a diagram showing an example of an operation unit;

FIG. 4 is a sectional diagram of the MFP;

FIG. 5 is a sequence diagram showing a rough flow of operation control at the time of input of a print job including specification of confirmation printing;

FIG. 6 is a diagram showing an example of a print setting screen;

FIG. 7 is a diagram showing an example of a confirmation printing mode screen;

FIG. 8 is a diagram showing a relationship between FIGS. 8A and 8B, and FIGS. 8A and 8B are flowcharts showing a flow of print control;

FIG. 9A to FIG. 9C are diagrams showing an example of a job list screen;

FIG. 10 is a diagram showing an example of a timeout setting screen;

FIG. 11 is a flowchart of use-target sheet feed unit determination processing;

FIG. 12 is a flowchart of before-print-start check processing;

FIG. 13 is a flowchart of reception processing of instructions to continue printing;

FIG. 14 is a flowchart of recovery processing;

FIG. 15A and FIG. 15B are diagrams showing an example of a recovery UI screen;

FIG. 16A to FIG. 16C are diagrams each showing an example of a sheet setting screen.

DESCRIPTION OF THE EMBODIMENTS

Figure 17:
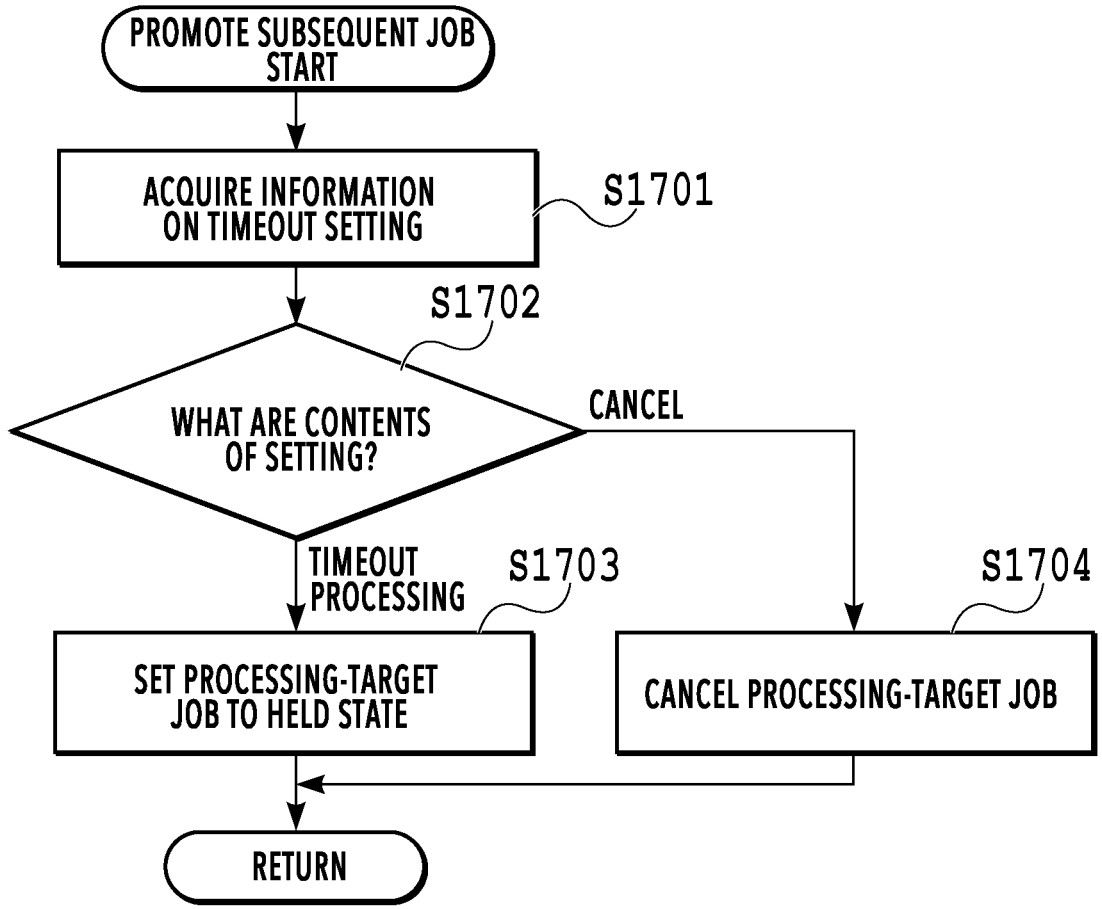
FIG. 17 is a flowchart of timeout processing.

In the following, embodiments for embodying the present invention are explained by using the drawings. The following embodiments are not intended to limit the invention according to the scope of the claims and all combinations of features explained in the embodiments are not necessarily indispensable to the solution of the invention.

First Embodiment

Figure 1:
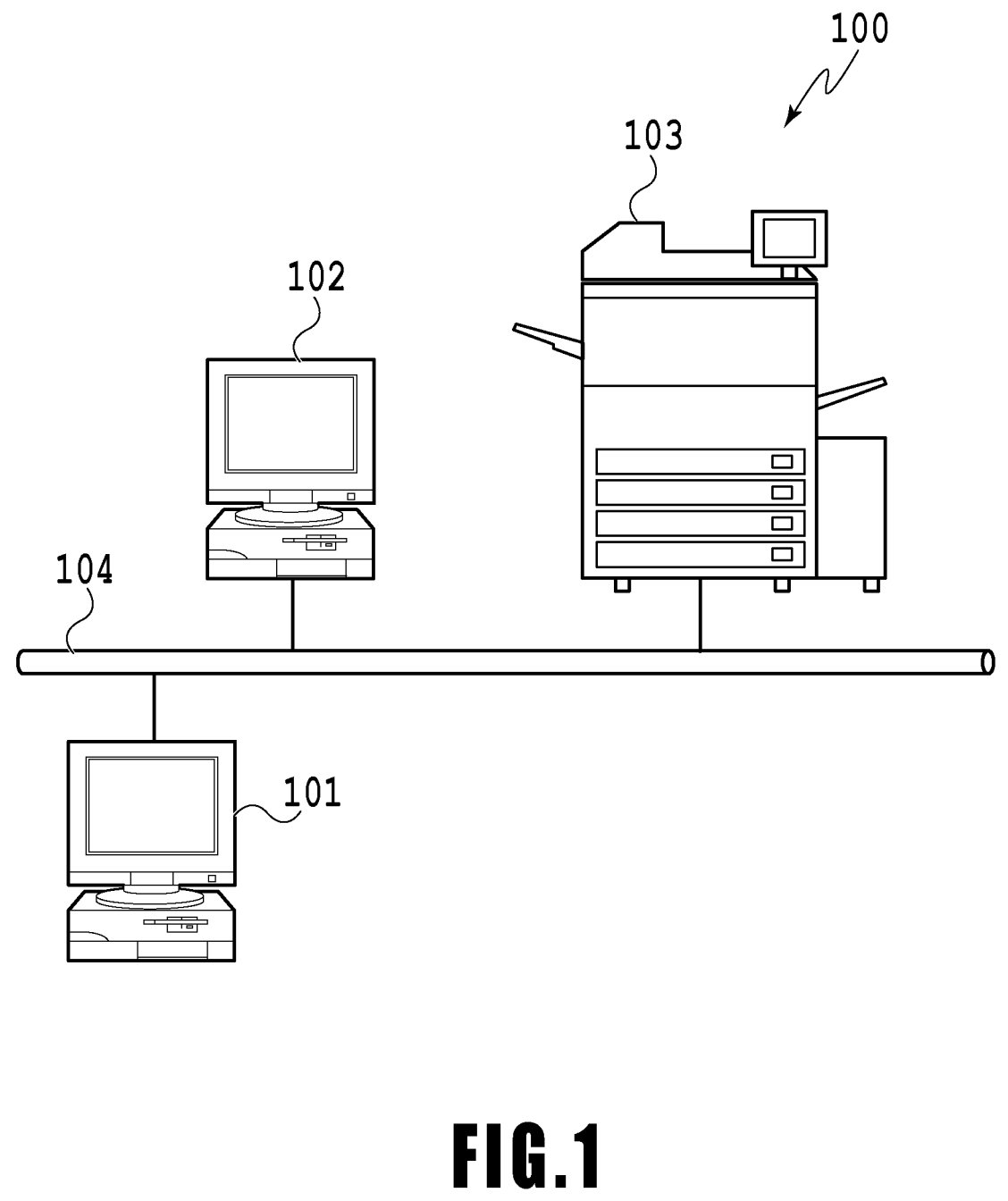

FIG. 1 is a diagram showing an example of a configuration of an image forming system in the present embodiment. An image forming system 100 includes client computers (hereinafter, PCs) 101 and 102 and a digital multi function printer (MFP) 103 as an image forming apparatus and the PCs 101 and 102 and the MFP 103 are connected to each other by a network 104. The internal configuration of the MFP 103 will be described later. The PCs 101 and 102 have standard components (CPU, memory, network interface, keyboard and so on) mounted on a general-purpose computer. Then, in a predetermined application (printer driver), a print job including drawing data described in a page description language (PDL) is generated and transmitted to the MFP 103 via the network 104, such as a LAN. The MFP 103 generates print data by interpreting and performing rendering for a PDL command included in the print job received from the PCs 101 and 102 and performs printing processing. In the printing processing, an image is formed on a printing medium, such as paper, by, for example, an electrophotographic method, and then, the printing medium is output to the outside.

The number of PCs or MFPs included in the image forming system is arbitrary and for example, more PCs than those or more MFPs than that in FIG. 1 may be connected to the network 104. Further, in the present embodiment, explanation is given by taking an MFP adopting the electrophotographic method as an example, but the image forming apparatus may be an SFP specialized in the printing function or one adopting another printing method, such as an ink jet method.

Figure 2:
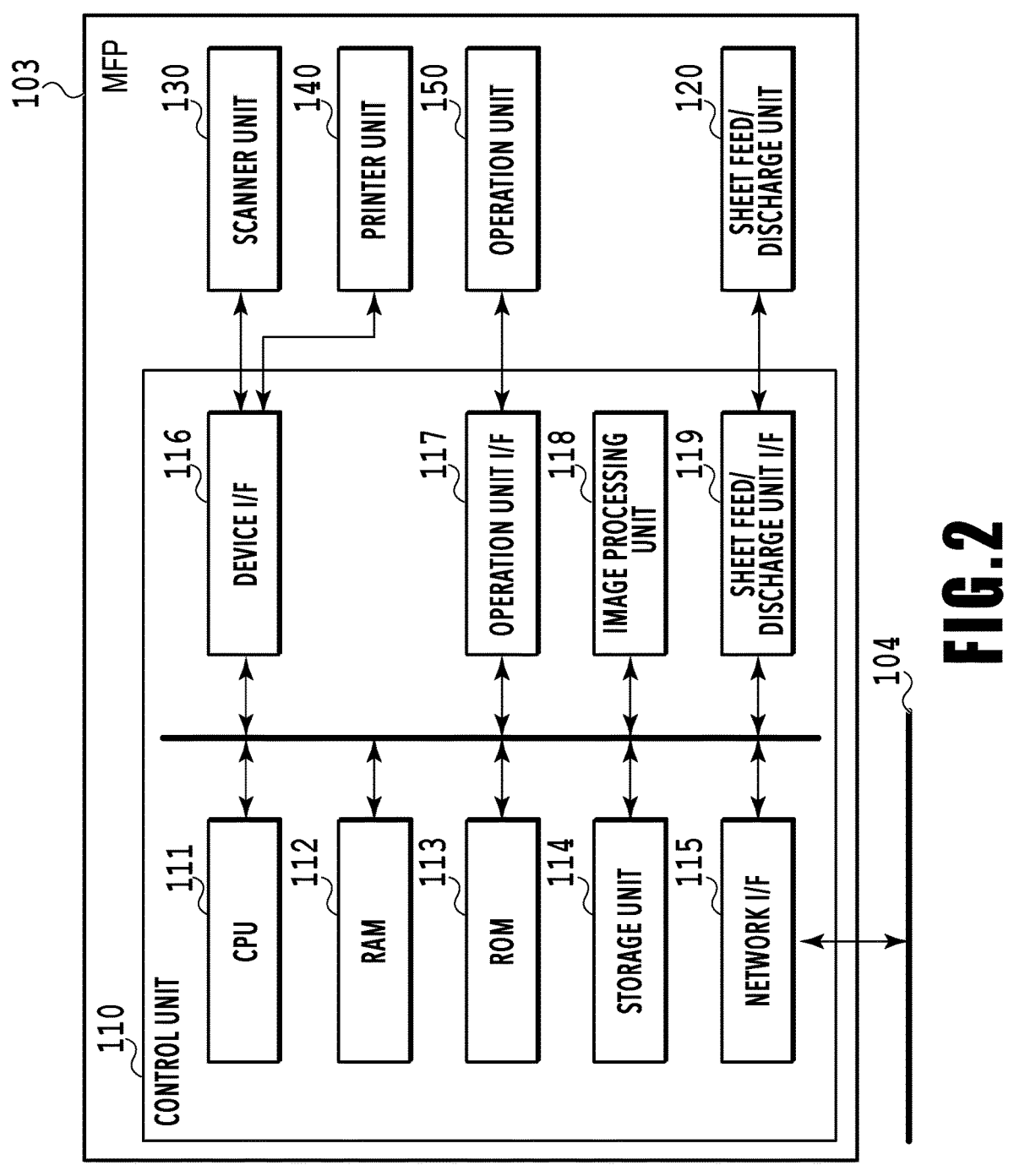

Next, the internal configuration of the MFP 103 is explained. FIG. 2 is a block diagram showing a main hardware configuration of the MFP 103. A control unit 110 is connected with a scanner unit 130, which is an image input device, a printer unit 140, which is an image output device, and so on, and centrally controls the MFP 103. Further, the control unit 110 is connected to the PCs 101 and 102 via the network 104. The control unit 110 further includes each of units 111 to 119 below.

The CPU 111 implements various functions including the timeout function and the confirmation printing function described above by loading various programs stored in a ROM 113 and a storage unit 114 onto a RAM 112 and executing the programs. The storage unit 114 is a large-scale storage device storing system software, image data and so on, for example, such as an HDD and an SSD. A network I/F 115 is an interface for performing transmission and reception of various kinds of information with an external device, such as the PCs 101 and 102, via the network 104, such as a LAN. A device I/F 116 is an interface for performing transmission and reception of image data with the scanner unit 130 and the printer unit 140. An operation unit I/F 117 is an interface that outputs image data that is displayed on an operation unit 150 to the operation unit 150 and receives information that is input by a user on the operation unit 150. FIG. 3 shows an example of the operation unit 150 and the operation unit 150 has a touch panel unit 301 and a hard key input unit (key input unit) 302 and receives instructions from a user via these units. An image processing unit 118 generates image data for print, which can be processed by the printer unit 140, by performing predetermined image processing for image data relating to instructions to perform printing or copying. The sheet feed/discharge unit I/F 119 is an interface for performing transmission and reception of commands and the like to control the operation of a sheet feed/discharge unit 120. The sheet feed/discharge unit 120 includes a sheet feed mechanism and a sheet discharge mechanism. For a sheet supplied from the sheet feed mechanism, printing processing is performed in the printer unit 130 and the sheet for which printing is completed (printed matter) is output from the sheet discharge mechanism.

Figure 4:
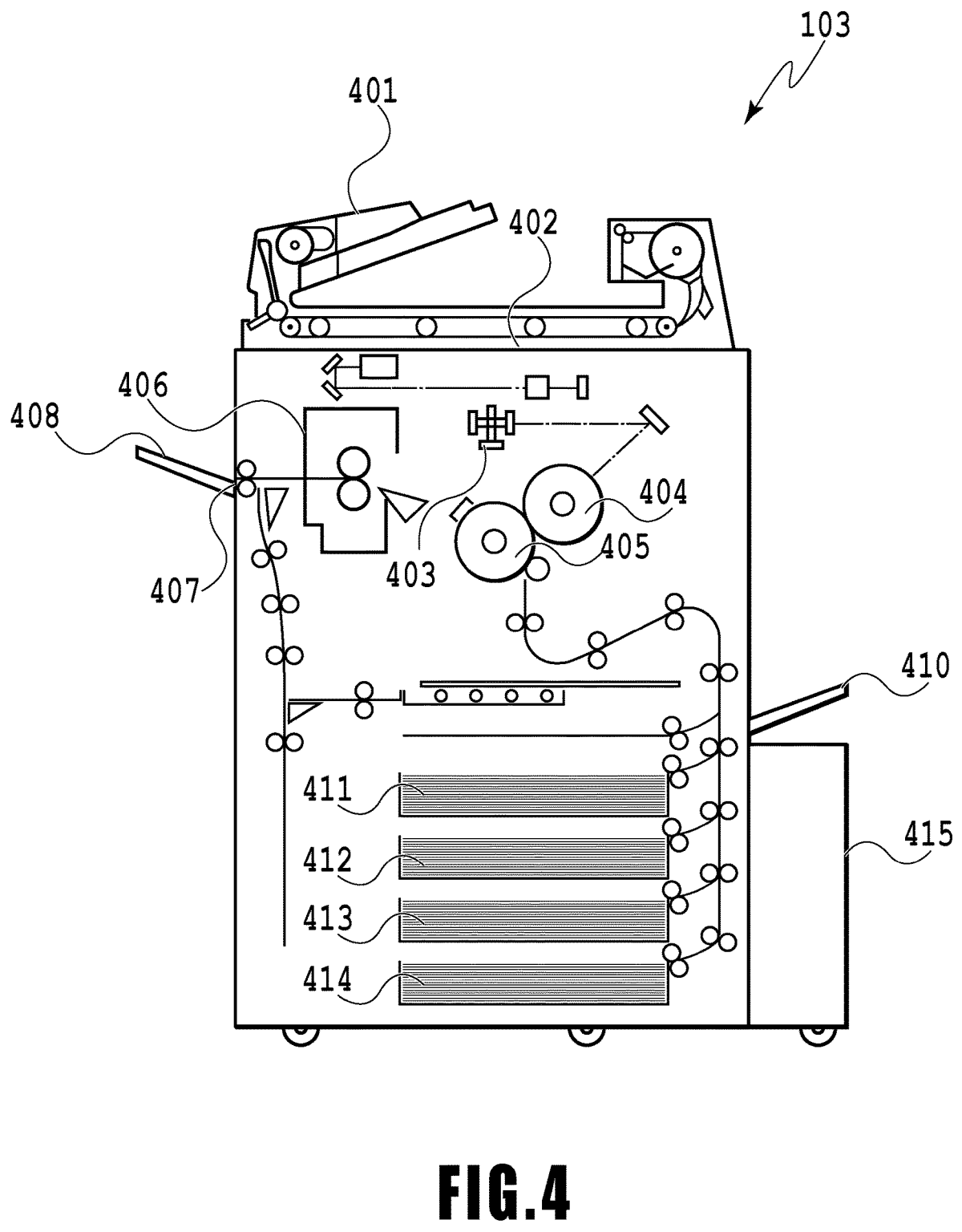

Here, by using the sectional diagram of the MFP 103 shown in FIG. 4, the configuration relating to printing processing is explained in detail. An auto document feeder (ADF) 401 separates pages one by one from a document bundle set on a load surface of a document tray and conveys the document onto a document table glass 402 of the scanner unit 130. Then, the image of the document conveyed onto the document table glass 402 is read and converted into image data by a CCD. A rotating polygon mirror (polygon mirror and the like) 403 causes a light ray, for example, such as laser light, modulated in accordance with image data to enter the rotating polygon mirror 403 and irradiates a photoconductor drum 404 with the light ray as reflected scan light via a reflection mirror. A latent image formed on the photoconductor drum 404 by laser light is developed by toner and a toner image is transferred to a sheet pasted onto a transfer drum 405. The sheet feed mechanism that supplies a sheet will be described later. By performing such a series of image forming processes sequentially for the toner of yellow (Y), magenta (M), cyan (C), and black (K), a full-color image is formed. After the image forming process performed four times, the sheet on the transfer drum 405, on which a full-color image is formed, is conveyed to a fixing unit 406. The fixing unit 406 internally includes a heat source, such as a halogen heater, and fuses and fixes the toner on the sheet onto which the toner image is transferred by heat and pressure. The sheet for which fixing of the toner is completed is conveyed to the outside of the apparatus (sheet discharge tray 408) by a sheet discharge roller 407.

The sheet feed mechanism includes a manual feed tray 410 used in the case where printing is performed on a nonstandard sheet, an envelope and so on, sheet feed cassettes 411 to 414 each capable of storing about 500 sheets, and a sheet feed deck 415 capable of storing more sheets (for example, about 5,000 sheets). It is possible to set various sheets different in size and material in a distinguished manner in the sheet feed cassettes 411 to 414 and the sheet feed deck 415. Further, it is possible to set a variety of printing media including a special material sheet, such as an OHP sheet, in the manual feed tray 410. Each of the manual feed tray 410, the sheet feed cassettes 411 to 414, and the sheet feed deck 415 is provided with a sheet feed roller and sheets are fed continuously one by one by the sheet feed roller.

The control unit 110 centrally controls each of the above-described units for implementing printing processing and performs a variety of functions possessed by the MFP 100. The numbers of manual feed trays, sheet feed cassettes, and sheet feed decks are not limited to the example described above, and for example, it may also be possible to provide a plurality of manual feed trays and to provide three or more sheet feed cassettes.

Figure 5:
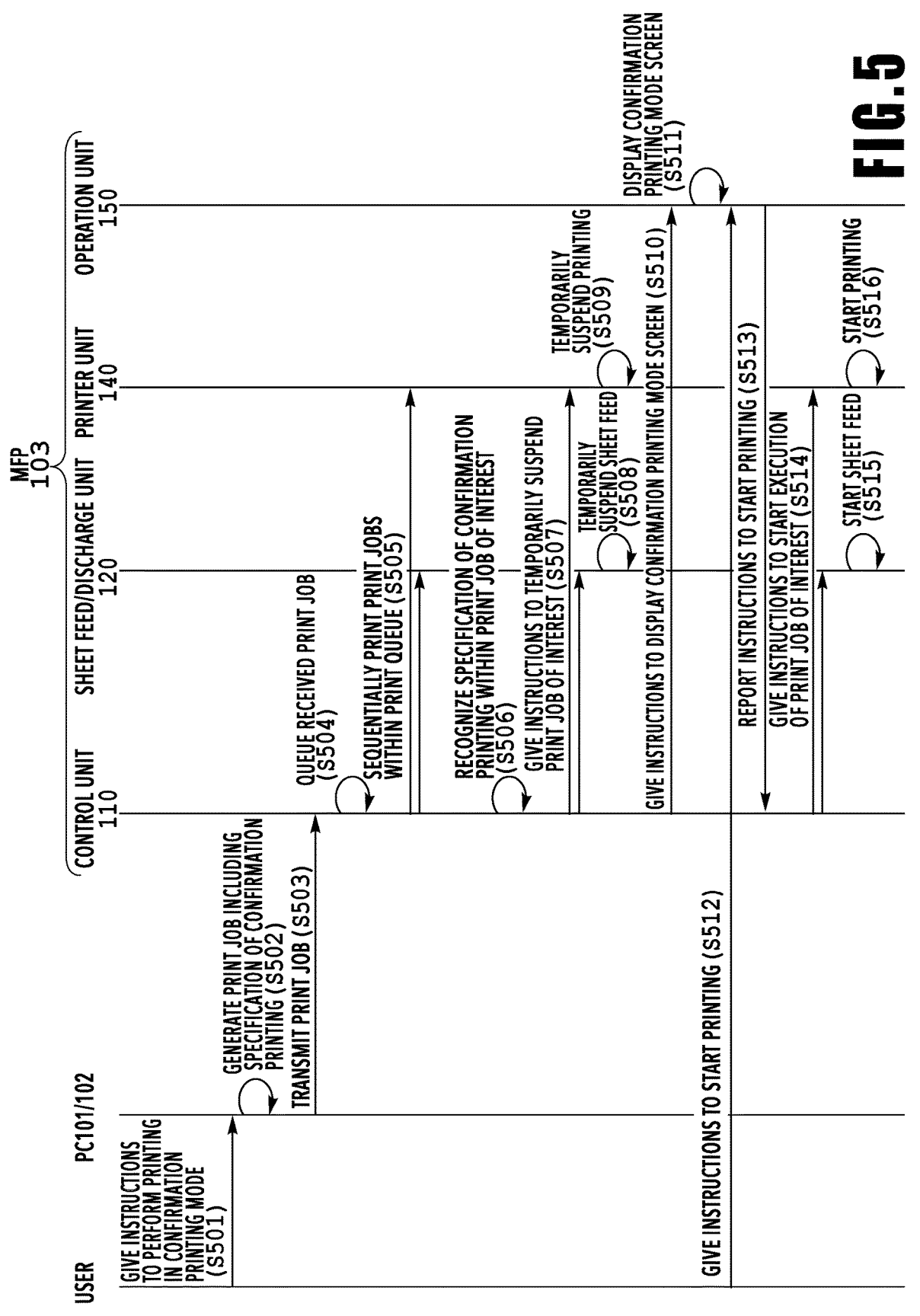

Next, the operation control of the confirmation printing function in the MFP 103 is explained. FIG. 5 is a sequence diagram showing a rough flow of the operation control at the time of input of a print job including specification of confirmation printing. In the following, detailed explanation is given along the sequence diagram in FIG. 5.

First, a user makes specification (specification of confirmation printing mode) to request a user of start confirmation of execution by using the printer driver within the PC 101 or 102 and gives instructions to perform printing (S501). FIG. 6 shows an example of a UI screen (print setting screen) at the time of giving instructions to perform printing in the confirmation printing mode. A print setting screen 600 shown in FIG. 6 is in the state where a "Sheet feed" tab is selected and a sheet feed unit selection box 601 in which a sheet feed unit that is used at the time of printing is specified, a checkbox 602 that is selected in the case where printing is performed in the confirmation printing mode and so on exist. In the case where a user checks the checkbox 602 within the print setting screen 600 and presses down an OK button 604, the printer driver within the PC 101 or 102 generates a print job including specification of confirmation printing (S502). By inputting an arbitrary character string in a "Job comment" box 603 within the UI screen 600, it is possible to display the input character string together on a UI screen (confirmation printing mode screen, details will be described later) that is displayed at the time of execution of a print job including specification of confirmation printing. Due to this, it is made possible for a user to grasp to whom and to which print job the print job that is performed from now belongs and corresponds. The print job including specification of confirmation printing thus generated is transmitted to the MFP 103 via the network 104 (S503). Then, the control unit 110 of the MFP 103 receives the print job transmitted from the PC 101 or 102 via the network I/F 115 and queues the print job in the print queue (S504). Next, the control unit 110 controls the sheet feed/discharge unit 120 and the printer unit 140 concurrently and sequentially processes the queued print jobs on a FIFO (First In First Out) basis (S505). Then, in the case where the time at which the print job for which print setting including specification of confirmation printing is performed is reached, the control unit 110 recognizes the specification of confirmation printing included in the print job (print job of interest) (S506). The control unit 110 having recognized that confirmation printing is specified in the execution-target print job of interest gives instructions to suspend operation to the sheet feed/discharge unit 120 and the printer unit 140 (S507). Then, in accordance with the instructions to suspend operation, the sheet feed/discharge unit 120 aborts sheet feed relating to the print job of interest and the printer unit 140 postpones the start of printing processing (S508, S509). Next, the control unit 110 gives instructions to display a UI screen (confirmation printing mode screen) to prompt start confirmation of printing processing for the temporarily suspended print job of interest to the operation unit 150 (S510). Then, the operation unit 150 having received the instructions to display a UI screen displays the confirmation printing mode screen on the touch panel unit 301 (S511). FIG. 7 shows an example of the confirmation printing mode screen. In the case where a user gives instructions to start printing via the UI screen such as this (S512), the operation unit 150 gives a notification to that effect to the control unit 110 (S513). Then, the control unit 110 having received the instructions to start printing from a user gives instructions to start printing relating to the temporarily suspended print job of interest to the sheet feed/discharge unit 120 and the printer unit 140, respectively (S514). Then, the sheet feed/discharge unit 120 and the printer unit 140 having received the instructions to start printing start sheet feed and printing relating to the print job of interest, respectively (S508, S509). The above is a rough flow of the operation control at the time of input of a print job including specification of confirmation printing.

<Print Control Main Flow>

Figure 8B:
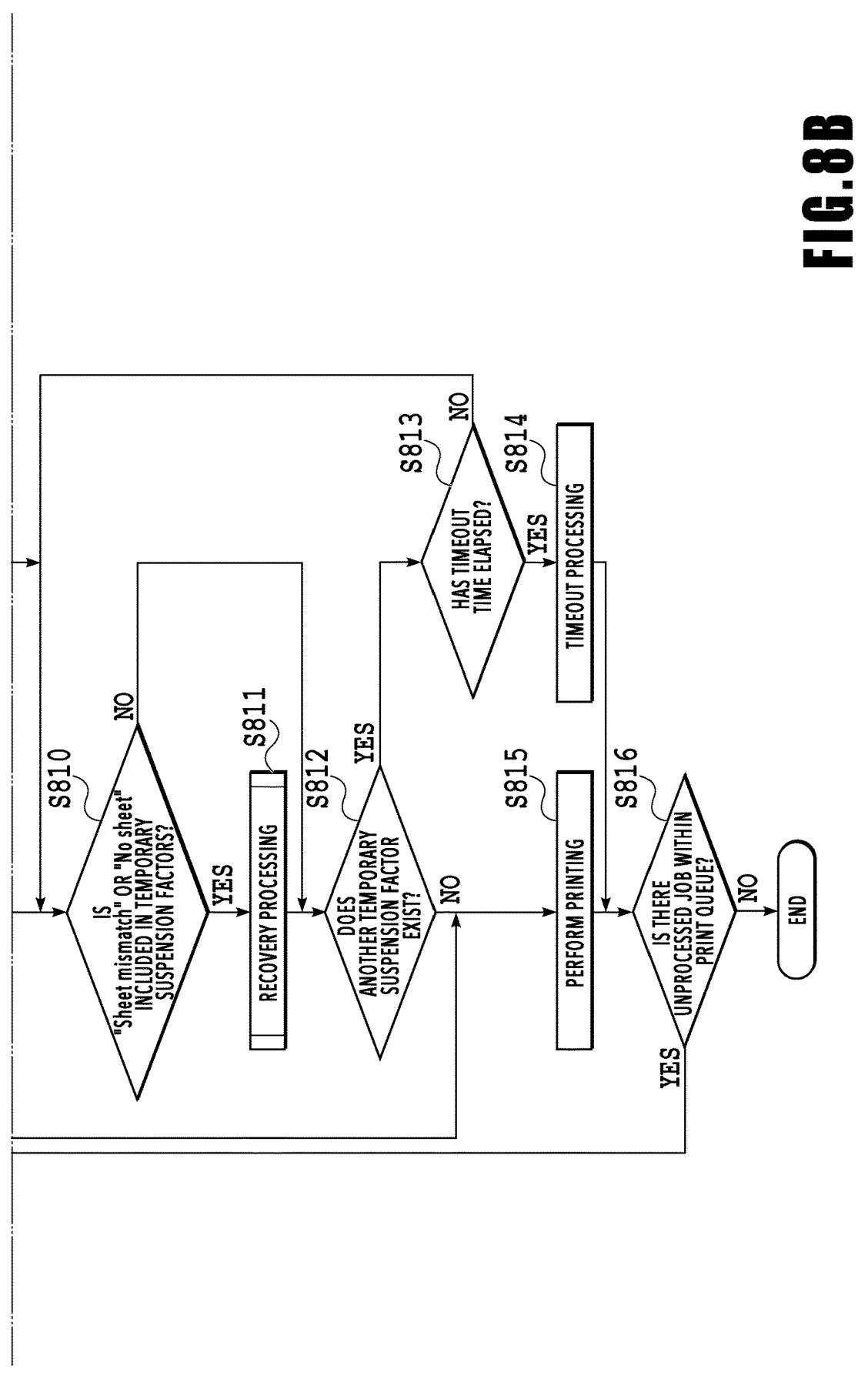

Next, the print control in the MFP 103 according to the present embodiment is explained. FIGS. 8A and 8B are flowcharts showing a flow of print control in the present embodiment, which makes an attempt to cause the timeout function and the confirmation printing function to coexist. A user who desires to perform printing by making use of the confirmation printing function specifies a sheet feed unit (for example, manual feed tray 410) that is used on the print setting screen 600 described previously by the PC 101 or 102 and presses down the OK button 604 in the state where the checkbox 602 is checked. Then, a print job for which the print setting including specification of confirmation printing and the sheet feed unit that is used at the time of execution is performed is generated and transmitted to the MFP 103. In the following explanation, a print job is called a "job" for convenience. The MFP 103 queues each job received via the network I/F 115 in the print queue and sequentially processes the jobs in order of input. The series of processing shown by the flow in FIGS. 8A and 8B are implemented by a predetermined program stored in the ROM 113 or the storage unit 114 being loaded onto the RAM 112 and being executed by the CPU 111.

First, at step 801, the top job in the print queue is determined as a job that is the target of processing (hereinafter, called "processing-target job"). At step 802 that follows, information on the print setting of the processing-target job is acquired. In the print setting information, in addition to the information on the size and type of the sheet that is used in the printing, information on the sheet feed unit that is used and information indicating whether to perform printing in the confirmation printing mode may be included. The information such as this is set via the print setting screen 600 in FIG. 6 described previously.

Next, at step 803, the processing to determine the sheet feed unit that is used (hereinafter, "use-target sheet feed unit") in execution of the processing-target job is performed. Details of the use-target sheet feed unit determination processing will be explained in detail by another flow. In the case where the processing to determine the use-target sheet feed unit is completed, at step 804, check processing before starting execution of the processing-target job is performed. In the before-print-start check processing, whether the processing-target print job satisfies the condition necessary for execution is checked. Details of the before-print-start check processing will also be explained in detail by another flow. By the use-target sheet feed unit determination processing and the before-print-start check processing, information indicating whether or not temporary suspension of printing processing is necessary and information indicating the cause thereof (temporary suspension factor information) as described below are generated. In the following, an example of a suspension flag as temporary suspension factor information is shown.

TABLE 1

| Whether or not temporary suspension is necessary | Cause: Sheet size mismatch | Cause: Sheet type mismatch | Cause: No sheet | Cause: Confirmation printing |
|---|---|---|---|---|
| 1 | 0 | 0 | 1 | 0 |

The above-described suspension flag is a flag indicating whether or not temporary suspension is necessary and the cause thereof by one bit, respectively, and "1" indicates affirmation and "0" indicates negation. As will be described later, another cause of temporary suspension exists and the cause is not limited to those described in the above-described table.

In the case where the before-print-start check processing is completed, at step 805, whether or not some temporary suspension factor is recognized is determined based on the above-described temporary suspension factor information and the processing is branched in accordance with the results of the determination. In the case where no temporary suspension factor is recognized, the processing advances to step 815 and execution of printing processing is started. On the other hand, in the case where some temporary suspension factor is recognized, the processing advances to step 806 and control to temporarily suspend execution of printing processing is performed. At this time, not only the processing-target job but also the subsequent jobs within the print queue are also controlled so that execution of printing processing is not started. Here, explanation is given by using a specific example.

Figure 9A:
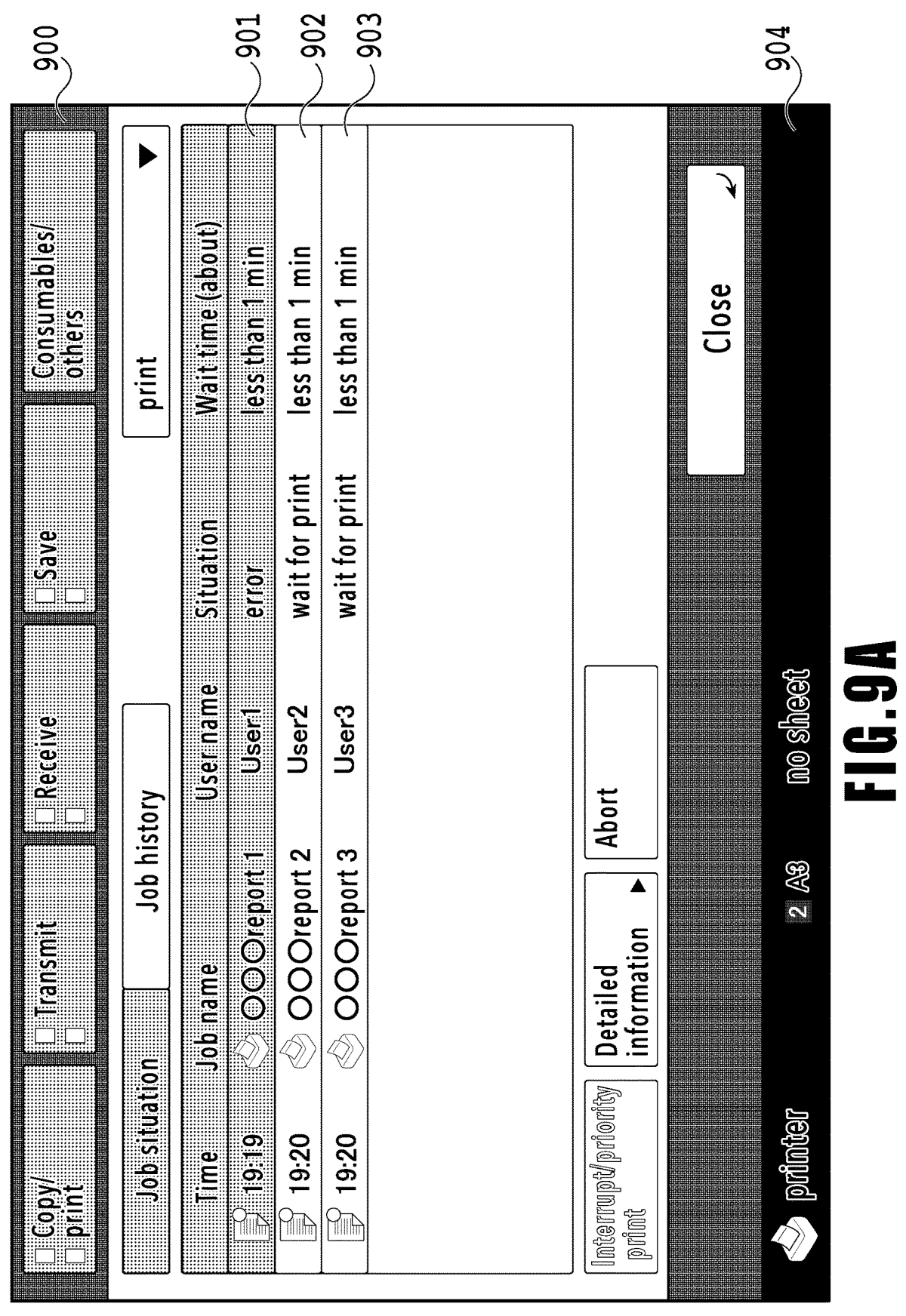

FIG. 9A to FIG. 9C are examples of a UI screen (job list screen) showing contents of a print queue. The example in FIG. 9A is a state where three print jobs 901 to 903 exist within the print queue and the start of printing processing is aborted due to a temporary suspension factor of "No sheet" of the top job 901. Because of this, the display of the situation of the temporarily suspended print job 901 is "error" and character information indicating the cause thereof is displayed in a message box 904 provided at the bottom of a job list screen 900. Then, the situation of the subsequent jobs 902 and 903 becomes "wait for print" and the subsequent jobs 902 and 903 are controlled so that the printing processing therefor is not started until the temporary suspension factor "No sheet" of the top job 901 is resolved and the printing processing is resumed and completed. The example in FIG. 9B is a state where three jobs 911 to 913 exist within the print queue as in FIG. 9A and the start of printing processing is aborted due to a temporary suspension factor of "Confirmation printing" of the top job 911. Because of this, the display of the situation of the temporarily suspended job 911 is "wait for print instructions" and the character information prompting a user to give instructions to start printing is displayed in the message box 904. Then, the situation of the subsequent print jobs 912 and 913 becomes "wait for print" and the subsequent print jobs 912 and 913 are controlled so that the printing processing therefor is not started until the temporary suspension factor (confirmation printing) of the top job 911 is resolved and the printing processing is resumed and completed.

In the case where execution of a processing-target job is aborted as described above, at step 807 that follows, the temporary suspension factor information described previously is referred to and whether "Confirmation printing" is included in the job abort reasons is determined. In the case where "Confirmation printing" is included, the processing advances to step 808 and processing to receive instructions to continue printing from a user is performed. Details of the reception processing of instructions to continue printing will be explained in detail by another flow. On the other hand, in the case where "Confirmation printing" is not included, the processing advances to step 809 and countdown processing of the timeout function is performed. The countdown processing is performed independently in parallel to various kinds of control in the charge of the control unit 110 by, for example, providing a dedicated timeout control unit (not shown schematically) within the control unit 110, and the like. Specifically, the countdown processing is as follows. First, setting information specifying a time (timeout time) until a timeout occurs is acquired. It may also be possible for a user to determine the timeout time in advance and to store the time in a memory or the like within the timeout control unit. FIG. 10 is an example of a UI screen (timeout setting screen) for performing setting relating to the timeout processing at the time of execution of a print job being aborted. On a timeout setting screen 1000 shown in FIG. 10, a button to set ON or OFF of the function itself exists and the configuration is made so that only in the case where an ON button 1001 is selected, the contents of setting in a detailed setting area 1002 are meaningful (become effective). Here, in the detailed setting area 1002, a time input box 1003 for setting a time caused to elapse from abort before a timeout occurs and a checkbox 1004 for selecting an operation that is applied at the time of occurrence of a timeout after a set time elapses are provided. Here, as alternatives of the operation at the time of a timeout, two kinds of operation, that is, "Cancel the aborted job" and "Promote the subsequent job" are prepared. The contents input or selected by a user are settled by an OK button 1005 being pressed down and stored in a RAM or the like. Then, at this step, in accordance with the setting information on the timeout time stored in the RAM or the like, the countdown processing is started by using an internal timer (not shown schematically).

As described above, in the present embodiment, it is important to perform control so that the countdown processing for a timeout is not started in the case where abort of execution of a print job occurs resulting from "Confirmation printing". Further, it is also important to perform control so that the countdown processing is not started in the case where "Confirmation printing" exists as a temporary suspension factor even though a temporary suspension factor, such as "No sheet" and "Sheet size unknown", is recognized at the same time. The reason is that many cases are considered where a user who performs printing using the confirmation printing function specifies the manual feed tray 410 as the sheet feed unit that is used and does not set a sheet at the point in time of input of a job. In such a case, at the time of aborting execution of the job in accordance with the confirmation printing setting within the job, the temporary suspension factor of "No sheet" also occurs at the same time. In the case where the countdown processing for a timeout is started in such a situation, the occurrence of the problem described previously will result. Consequently, in the case where abort of execution of a print job occurs resulting from confirmation printing, the countdown processing for a timeout is not started.

In the case where instructions to continue printing for the confirmation printing are received at step 808 or in the case where the countdown processing for a timeout is started at step 809, the processing advances to step 810. At step 810, one of the causes of "Sheet size mismatch", "Sheet type mismatch", and "No sheet" is included in the job abort reasons is determined by referring to the temporary suspension factor information described previously. In the case where one of the causes is included, the processing advances to step 811 and recovery processing to cancel the temporary suspension factor and to start printing processing is performed. Details of the recovery processing will be explained with reference to another flow. On the other hand, in the case where none of the causes is included, the processing advances to step 812.

At step 812, whether or not some temporary suspension factor still remains is determined. In the case where it is determined that all the temporary suspension factors, such as "Confirmation printing" and "No sheet", are resolved and any other temporary suspension factor does not exist, the processing advances to step 815 and the execution of printing processing is started. On the other hand, in the case where it is determined that some temporary suspension factor remains, the processing advances to step 813 and whether the countdown started at step 809 advances and a predetermined timeout time has elapsed is determined. In the case where the timeout time has not elapsed, the processing returns to step 810 and the processing to determine whether the temporary suspension factors are resolved is repeated. On the other hand, in the case where the timeout time has elapsed, the processing advances to step 814 and the timeout processing is performed. The timeout processing is also called mismatch action processing and is processing to, in the case where it is difficult to appropriately perform a processing-target job for some reason, cancel the job or promote a subsequent job. Details of the timeout processing will also be explained with reference to another flow. After the timeout processing is completed, the processing advances to step 816.

At step 816, whether there is an unprocessed job within the print queue is determined. In the case where there is an unprocessed job, the processing returns to step 801, and the top job within the print queue is determined to be a processing-target job and the processing is continued. On the other hand, in the case where there is no unprocessed job, this processing is terminated. The above is the outline of the print control to make an attempt to cause the timeout function and the confirmation printing function to coexist according to the present embodiment.

In the present embodiment, in the case where abort of execution of a job occurs resulting from confirmation printing, control is performed so that the countdown processing for a timeout is not started. Due to this, the occurrence of such a problem described previously is avoided that a timeout occurs at the time of performing printing in the confirmation printing mode and it is no longer possible to perform confirmation printing. Following the above, each subroutine performed in the process of the flow in FIGS. 8A and 8B is explained.

<<Use-Target Sheet Feed Unit Determination Processing>>

Figure 11:
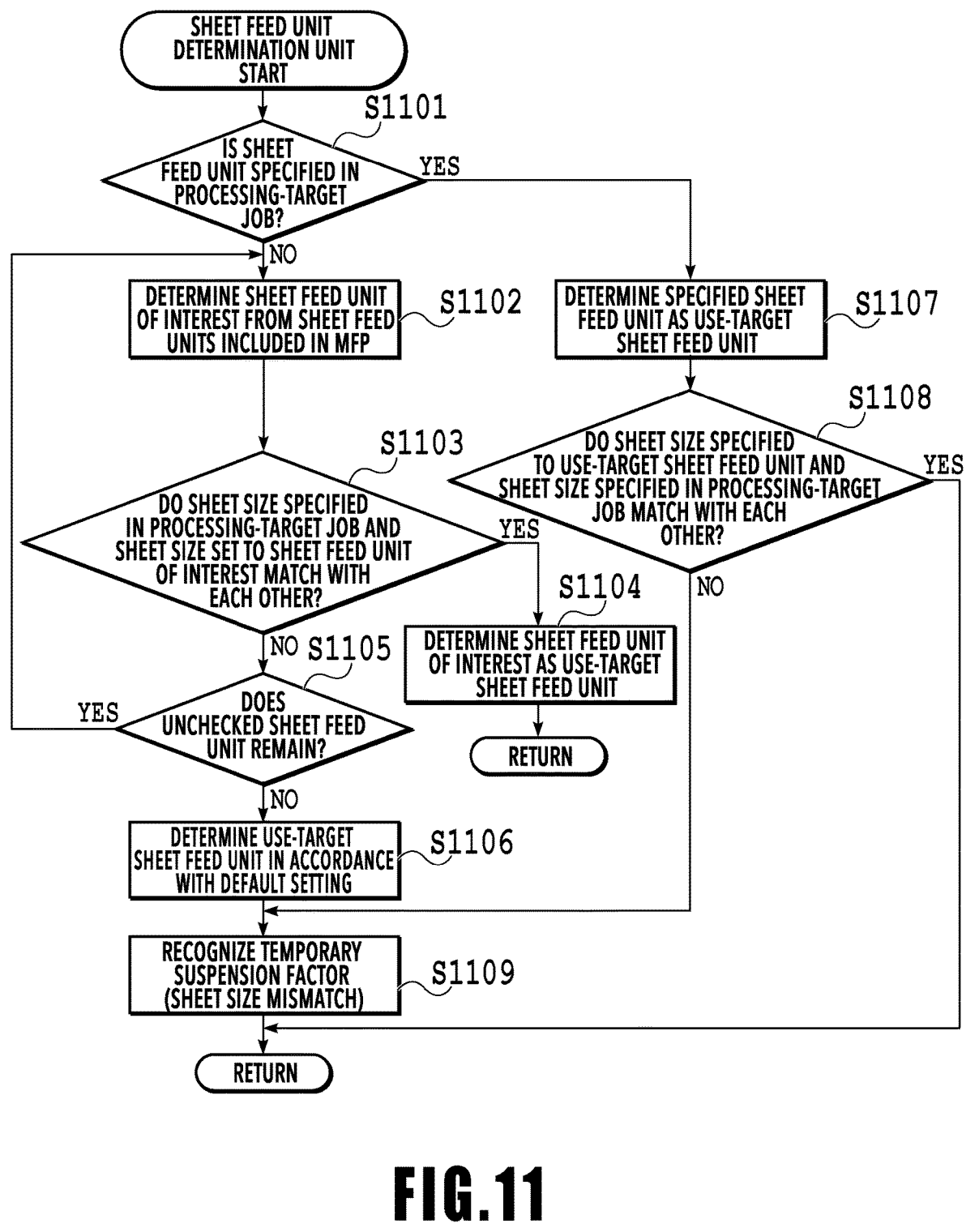

Details of the use-target sheet feed unit determination processing are explained along the flowchart in FIG. 11.

First, at step 1101, whether or not a specific sheet feed unit is specified is determined based on the setting information relating to the sheet feed unit, which is included in the print setting information acquired at step 802 described previously. In the case of the present embodiment, one of the manual feed tray 410, the sheet feed cassettes 411 to 414, and the sheet feed deck 415 is specified or no specification is made relating to the sheet feed unit (blank or "auto" is specified). In the case where a specific sheet feed unit is not specified, the processing advances to step 1102 and in the case where a specific sheet feed unit is specified, the processing advances to step 1107.

At step 1102, one sheet feed unit of interest is determined from the sheet feed mechanisms (here, the manual feed tray 410, the sheet feed cassettes 411 to 414, and the sheet feed deck 415) of the sheet feed/discharge unit 120. At step 1103 that follows, whether or not the sheet size specified by the setting information relating to the sheet size, which is included in the print setting information acquired at step 802 described previously, and the sheet size set to the sheet feed unit of interest determined at step 1102 match with each other is determined. Normally, for each sheet feed unit, a specific sheet size is assigned in advance by a user (for example, A4 for the sheet feed cassette 411, A3 for the sheet feed cassette 412 and so on). Whether the sheet size set to each sheet feed unit and the sheet size specified in the processing-target job match with each other is checked at this step. In the case where the sheet size specified in the processing-target job and the sheet size set to the sheet feed unit of interest match with each other, the processing advances to step 1104. On the other hand, in the case where both the sheet sizes do not match with each other, the processing advances to step 1105.

At step 1104, the sheet feed unit of interest for which matching is determined at step 1103 is determined as the use-target sheet feed unit of the processing-target job. After the determination, this flow is exited (that is, the processing advances to step 804 of the flow in FIG. 8A).

At step 1105, whether an unchecked sheet feed unit remains is determined. In the case where all the sheet feed units have already been checked, the processing advances to step 1106. On the other hand, in the case where an unchecked sheet feed unit remains, the processing returns to step 1102, and the next sheet feed unit of interest is determined and the processing is continued.

At step 1106, the specific sheet feed unit set in advance as the default sheet feed unit is determined as the use-target sheet feed unit of the processing-target job. However, at the point in time at which the determination is performed, the sheet of the sheet size optimum to the processing-target job is not set in the sheet feed mechanism of the MFP 103. Because of this, it is not possible to advance the printing processing of the processing-target job without taking any measures (that is, printing processing is obliged to temporarily suspend). In order to deal with this, after the use-target sheet feed unit is determined based on the default setting, the processing advances to step 1109.

At step 1107 in the case where a specific sheet feed unit is specified in the processing-target job, the sheet feed unit relating to the specification is determined as the use-target sheet feed unit of the processing-target job. At step 1108 that follows, whether the sheet size set to the use-target sheet feed unit and the sheet size specified in the processing-target job match with each other is determined. The reason such determination is performed is that even in the case where both the sheet size and the sheet feed unit are specified in the processing-target job, both do not necessarily match with each other at all times. Further, normally, for the manual feed tray capable of storing a variety of sheets, a specific sheet size is not set (for example, set to "indefinite"), and therefore, the reason is to deal with mismatching in such a case. In order to dealt with such a situation, in the case where it is determined that the sheet sizes do not match with each other, the processing advances to step 1109. On the other hand, in the case where the sheet sizes match with each other, this flow is exited (that is, the processing advances to step 804 of the flow in FIG. 8A).

At step 1109, "Sheet size mismatch" indicating that the sheet of the sheet size optimum to the processing-target job is not set in the use-target sheet feed unit (whether the sheet is set is unknown is also included) is recognized as a temporary suspension factor. By the recognition, the temporary suspension factor information described previously is generated and stored in the RAM 112 or the like. The above is the contents of the use-target sheet feed unit determination processing.

<<Before-Print-Start Check Processing>>

Details of the before-print-start check processing (step 804) are explained along the flowchart in FIG. 12.

First, at step 1201, whether or not the sheet type specified by the setting information relating to the sheet type, which is included in the print setting information acquired at step 802 described previously, and the sheet type set to the use-target sheet feed unit determined at step 803 match with each other is determined. The sheet type here refers to the kind of sheet, for example, such as plain sheet, thick sheet, and glossy sheet. There is a case where a user specifies the kind of sheet that is used in a job depending on uses or purposes of the printed matter. Further, there is a case where a specific sheet type is assigned for each sheet feed unit, for example, for the sheet feed cassette 411, the plain sheet is assigned, for the sheet feed cassette 412, the glossy sheet is assigned and so on. The determination processing is performed based on information on the sheet type specified in a job or set to each sheet feed unit as described above. In the case where the sheet type specified in a processing-target job and the sheet type set to the use-target sheet feed unit match with each other, the processing advances to step 1203. On the other hand, both the sheet types do not match with each other, the processing advances to step 1202.

At step 1202, "Sheet type mismatch" indicating that the sheet of the sheet type optimum to the processing-target job is not set in the use-target sheet feed unit is recognized as a temporary suspension factor. By the recognition, as in the case with step 1109 in the sheet feed unit determination processing described previously, temporary suspension factor information indicating that printing processing is temporarily suspended and the cause thereof is generated and stored.

At step 1203, whether or not the sheet is set in the use-target sheet feed unit is determined. In the case where the sheet is not set, the processing advances to step 1204. Then, at step 1204, "No sheet" indicating that the sheet necessary for printing is not set in the use-target sheet feed unit is recognized as a temporary suspension factor. By the recognition, as in the case with step 1202 described above, temporary suspension factor information is generated and stored. On the other hand, in the case where the sheet is set, the processing advances to step 1205.

At step 1205, whether or not printing in the confirmation printing mode is specified is determined based on the setting information on the confirmation printing, which is included in the print setting information acquired at step 802 described previously. In the case where printing in the confirmation printing mode is specified, the processing advances to step 1206. Then, at step 1206, "Confirmation printing" indicating that printing in the confirmation printing mode is specified is recognized as a temporary suspension factor. By the recognition, as in the case with step 1202 described above, temporary suspension factor information is generated and stored. On the other hand, in the case where printing in the confirmation printing mode is not specified, the processing advances to step 1207.

At step 1207, whether some temporary suspension factor exists is determined based on another piece of setting information included in the print setting information acquired at step 802 described previously. For example, the case where full-color printing is specified, but there is no remaining amount of one of color materials of CMYK, and the case where stapling or punching is specified in the finisher function, but there is no staple or there is much scrap will form another temporary suspension factor. In the case where such another temporary suspension factor exists, the processing advances to step 1208. Then, at step 1208, the temporary suspension factor corresponding to each cause is recognized. By the recognition, as in the case with the step 1202 described above, temporary suspension factor information is generated and stored. On the other hand, in the case where another temporary suspension factor does not exist, this flow is exited (that is, the processing advances to step 805 of the flow in FIG. 8A). The above is the contents of the before-print-start check processing.

<<Reception Processing of Instructions to Continue Printing>>

Details of the reception processing of instructions to continue printing are explained along the flowchart in FIG. 13.

First, at step 1301, a Confirmation printing mode screen 700 described previously for a user to give instructions to continue printing, which resume the temporarily suspended job of confirmation printing, is displayed. At this time, the contents of the job comment included in the print setting information acquired at step 802 are also displayed at a screen bottom 702. At step 1302 that follows, whether or not instructions to continue printing of a user are input via the Confirmation printing mode screen 700 is determined. Here, in the case where an OK button 701 is pressed down, the instructions to continue printing are received. In the case where the reception of the instructions to continue printing of a user is confirmed, the processing advances to step 1303. On the other hand, in the case where it is not possible to confirm the reception of the instructions to continue printing of a user within a predetermined time, the processing advances to step 1304.

At step 1303, the temporary suspension factor of "Confirmation printing" is cancelled. Specifically, the flag value corresponding to "Confirmation printing" of the flag indicating each cause of the suspension flag described previously is changed from "1" to "0". Further, at step 1304, error processing, such as displaying an error message, is performed. After the error processing is completed, the execution control itself of jobs in accordance with the print queue is terminated (that is, the flow itself shown by FIGS. 8A and 8B is terminated). The above is the contents of the reception processing of instructions to continue printing.

<<Recovery Processing>>

Details of the recovery processing (step 811) are explained along the flowchart in FIG. 14.

Figure 15A:
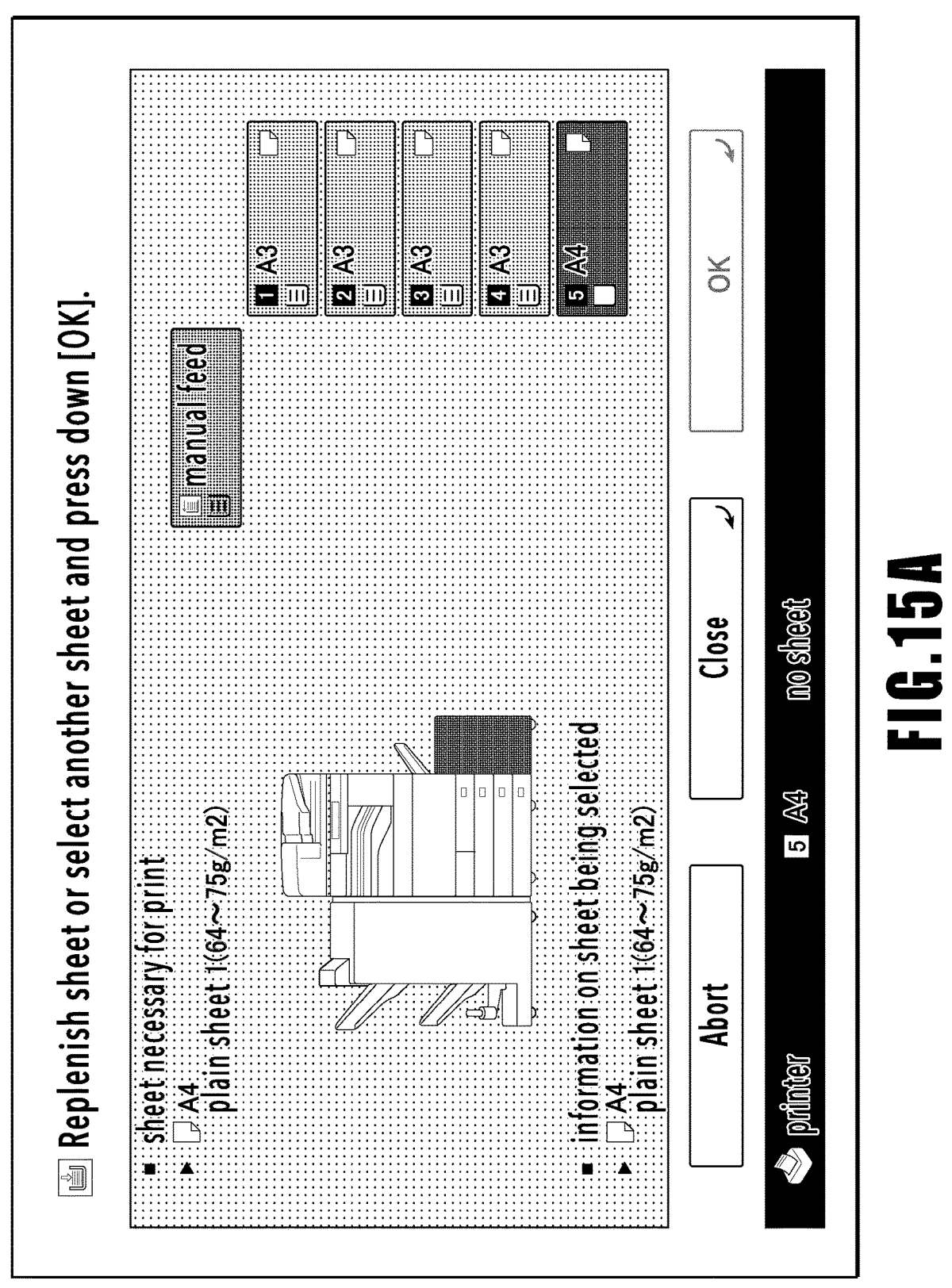

First, at step 1401, a UI screen (hereinafter, recovery UI screen) for prompting a user to perform an operation to remove a temporary suspension factor for starting execution of a processing-target job is displayed. For example, in the case where the sheet size and the sheet type specified in the processing-target job and the sheet size and the sheet type set to the use-target sheet feed unit match with each other, but the sheet does not exist, a recovery UI screen as shown in FIG. 15A is displayed. In the case of FIG. 15A, the sheet necessary for printing determined based on the processing-target job is plain sheet 1 of A4 size and the setting of the sheet feed deck 415 determined as the use-target sheet feed unit is also plain sheet 1 of A4 size, but the sheet does not exist in the sheet feed deck 415, and therefore, the contents are such that replenishment of the sheet is prompted. Further, in the case where the sheet size and the sheet type specified in the processing-target job and the sheet size and the sheet type set to the use-target sheet feed unit do not match with each other, a recovery UI screen as shown in FIG. 15B is displayed. In the case of FIG. 15B, the sheet necessary for printing determined based on the processing-target job is the A4 sheet, but the sheet feed unit for which the A4 sheet is assigned does not exist, and therefore, the contents are such that the uppermost sheet feed cassette, which is the default setting, is determined as the use-target sheet feed unit is reported.

At step 1402, whether the sheet is replenished (in the case of the recovery UI screen in FIG. 15A), or whether the setting of the sheet size and the sheet type for the use-target sheet feed unit is changed in accordance with the necessity (in the case of the recovery UI screen in FIG. 15B) is determined. In the case where the sheet is replenished or the necessary setting of the sheet size and the sheet type is performed, the processing advances to step 1403 and in the other cases, the processing advances to step 1405. Here, explanation is given by taking a specific example.

1) In the case where the sheet size and the sheet type set to the sheet feed unit and those of the sheet used in the job match with each other, but the sheet is not set in the sheet feed unit in question.

In this case, for example, a user performs the operation to pull out the sheet feed cassette that is used, set the necessary sheet, and return the sheet feed cassette to the original position. In the case where whether or not the use-target sheet feed unit is opened and whether or not the sheet exists in the use-target sheet feed unit as described above are detected by, for example, a sensor provided to the use-target sheet feed unit, the processing advances to step 1403.

2) In the case where the sheet size and the sheet type set to the sheet feed unit and those of the sheet used in the job do not match with each other, and the sheet is not set in the sheet feed unit in question.

In this case, for example, a user pulls out the sheet feed cassette that is used, sets the necessary sheet by adjusting the sheet guide as needed and the like, and performs the setting of the sheet size and the sheet type for the sheet feed cassette after returning the sheet feed cassette to the original position. FIG. 16A to FIG. 16C are examples of a UI screen (sheet setting screen) for performing sheet setting. FIG. 16A is a UI screen to select a target sheet feed unit of sheet setting, FIG. 16B is a UI screen to perform sheet size setting, and FIG. 16C is a UI screen to perform sheet type setting. By using these UI screens, a user performs sheet size setting and sheet type setting for the use-target sheet feed unit. In the case where whether or not the use-target sheet feed unit is opened and the existence of the set sheet are detected, and the setting of the sheet size and the sheet type is performed for the use-target sheet feed unit, the processing advances to step 1403.

3) In the case where the sheet is set in the sheet feed unit, but the sheet size or the sheet type of the sheet is different from that of the sheet used in the job.

In this case, for example, a user pulls out the sheet feed cassette that is used, removes the currently set sheet and sets another sheet (exchange of sheets), and performs the setting of the sheet size and the sheet type for the sheet feed cassette after returning the sheet feed cassette to the original position. How to perform the sheet setting is the same as described previously. As in the case of 2) described above, in the case where whether or not the use-target sheet feed unit is opened and the existence of the set sheet are detected, and the setting of the sheet size and the sheet type is performed for the use-target sheet feed unit, the processing advances to step 1403.

In the case where the manual feed tray 410 is specified in the processing-target job, a scene in which the sheet is not placed yet is a state corresponding to 2) described above and a scene in which the sheet is placed, but the sheet setting is not performed yet is a state corresponding to 3) described above. The reason is that for the manual feed tray 410 compatible with a variety of sheets, the sheet size and the sheet type are set to "indefinite", and therefore, normally, those of the manual feed tray 410 do not match with the contents specified in the processing-target job. A user who uses the manual feed tray 410 sets the sheet in the manual feed tray 410, and then performs the sheet setting via the UI screens shown in FIG. 16A to FIG. 16C described above.

At step 1403, whether or not the sheet size and the sheet type specified in the processing-target job and the sheet size and the sheet type set to the use-target sheet feed unit match with each other is determined. In the case where the sheet size specified in the processing-target job and the sheet size set to the sheet feed unit of interest match with each other, the processing advances to step 1404. On the other hand, in the case where both the sheet sizes do not match with each other, the processing advances to step 1405.

At step 1404, the temporary suspension factor of "No sheet", "Sheet size mismatch", or "Sheet type mismatch" is cancelled. Specifically, the relevant flag value of the flag indicating each cause of the suspension flag described previously is changed from "1" to "0". At step 1405 that follows, whether another temporary suspension factor is cleared is determined. That is, whether the color material is replenished, whether the staple for stapling is replenished, whether accumulated punch scrap is removed and so on are determined. In the case where another temporary suspension factor does not exist originally or another temporary suspension factor is not cleared, this flow is exited (that is, the processing advances to step 812 of the flow in FIG. 8B). On the other hand, in the case where another temporary suspension factor is cleared, after the corresponding temporary suspension factor is cancelled at step 1406, this flow is exited. The above is the contents of the recovery processing.

<<Timeout Processing>>

Details of the timeout processing (step 814) are explained along the flowchart in FIG. 17.

At step 1701, operation setting information at the time of a timeout is acquired from the storage unit 114. The operation at the time of a timeout is set in advance by a user via the timeout setting screen illustrated in FIG. 10 described previously and stored in the storage unit 114. At step 1702 that follows, the processing is branched based on the contents of the acquired operation setting at the time of a timeout. Specifically, in the case where the contents of the operation setting at the time of a timeout are "Promote the subsequent job", the processing advances to step 1703 and in the case where the contents are "Cancel the aborted job", the processing advances to step 1704.

At step 1703, a processing-target job whose timeout time has elapsed while remaining in the temporarily suspended state is set to a held state. Further, at step 1704, the processing-target job whose timeout time has elapsed while remaining in the temporarily suspended state is cancelled. In the case where the processing-target job is set to the held state or cancelled, this flow is exited. Due to this, the next job within the print queue is determined to be a processing-target job (Yes at step 816, then step 801). Here, the promotion of a subsequent job is supplemented. FIG. 9C is a job list screen in the case where the temporarily suspended top job 901 in FIG. 9A enters the held state because a timeout occurs due to "No sheet" and the subsequent job 902 arranged next the top job 901 within the print queue becomes a job 922 during printing. Then, the situation display of a job 921 set to the held state is changed from "error" at the time of temporary suspension to "being held". For the job set to the held state in this manner, printing is not started until a user gives instructions again to perform printing. The other jobs queued within the print queue are controlled so that printing thereof is started by overtaking the job in the held state. In the case where there is a job in the held state that needs to be given again instructions to perform printing, a message or the like to that effect is displayed in the message box 904 at the bottom of the screen.

The above is the contents of the timeout processing.

Modification Examples

In the example described above, the job for which "Confirmation printing" is specified is controlled so as to be excluded without exception from the target of timeout processing. In place of uniformly excluding the job for which "Confirmation printing" is specified from the target of application of timeout processing, it may also be possible to perform control so as to appropriately change the timeout time after including the job for which "Confirmation printing" is specified in the target of application together with jobs other than the job for which "Confirmation printing" is specified. Specifically, in the case where "Confirmation printing" is recognized, on a condition that the timeout time set and stored in a memory or the like within the timeout control unit is longer than or equal to a threshold value specified separately (for example, 5 min), the set and stored timeout time is adopted and the countdown is started and on the other hand, on a condition that the set timeout time is shorter than the threshold value specified separately, the timeout time of the threshold value is adopted in place of the set timeout time and the countdown is started and so on.

Further, it may also be possible to cause a job that is input to internally have information on the timeout time and to start the countdown in accordance with the information. Specifically, in the case where information on the timeout time is included within the print setting information acquired at step 802 of the flow in FIG. 8A, the control is performed so that the timeout time is adopted and the countdown is started. Then, in the case where information on the timeout time is not included within the print setting information, the control explained in the above-described embodiment, or the control using the above-described threshold value is performed. As described above, it may also be possible to incorporate information on the timeout time in the data structure of a job and to perform the countdown by giving priority to the timeout time incorporated in the job over the timeout time set to the MFP.

According to those modification examples, in the case where a job of "Confirmation printing" is also included in the target of timeout processing, it is made possible to avoid the problem that arises in the case where a job of "Confirmation printing" is left in the temporarily suspended state while avoiding the problem that arises in the case where the set timeout time is too short.

According to the present embodiments including the modification examples described above, in an image forming apparatus that sequentially performs input print jobs on a FIFO basis, it is possible to use both the timeout function and the confirmation printing function without losing the original functions thereof. Due to this, it is possible to obtain both the effects of prevention of a reduction in productivity due to the timeout function and prevention of erroneous printing due to the confirmation printing function.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in an image forming apparatus in which execution of an input print job may be suspended due to a variety of factors including confirmation printing, it is made possible to use both the timeout function and the confirmation printing function without contradiction. Due to this, it is possible to obtain both the effects of prevention of a reduction in productivity due to the timeout function and prevention of erroneous printing due to the confirmation printing function.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-213952 filed Nov. 6, 2017, which is hereby incorporated by reference herein in its entirety.

What is claimed is:

1. An image forming apparatus comprising:
   a receiver that receives a plurality of jobs, wherein the plurality of jobs includes a first job and a second job which is received following the first job; and
   a controller that suspends, in a case where a predetermined condition for execution of the first job is not satisfied, execution of the first job,
   wherein the controller determines if the first job is a job specified to require a user confirmation for execution of the job,
   wherein the controller starts, if it is determined that the first job is not the job specified to require the user confirmation for execution of the job and the second job is executable, execution of the second job based on elapse of a predetermined time period in a state that the predetermined condition is not satisfied, and
   wherein the controller does not start, if it is determined that the first job is the job specified to require the user confirmation for execution of the job, execution of the second job based on the elapse of the predetermined time period in a state that the predetermined condition is not satisfied even if the second job is executable.

2. The image forming apparatus according to claim 1, wherein
   the job specified to require the user confirmation for execution of the job is a job specified to display a message that requires a user to confirm sheets set in a sheet holding unit for the first job.

3. The image forming apparatus according to claim 1, wherein
   the controller starts, in a case where the predetermined condition is not satisfied and the first job is not the job specified to require the user confirmation for execution of the job, counting for detecting that the predetermined time period elapses.

4. The image forming apparatus according to claim 1, wherein
   the first job and the second job are print jobs received from an external information processing apparatus.

5. The image forming apparatus according to claim 1, further comprising a user interface,
   wherein the job specified to require the user confirmation for execution of the job is a job specified to require reception of an instruction for execution of the job by the user interface, and
   wherein the predetermined condition for execution of the first job is reception of an instruction for execution of the first job by the user interface.

6. A method of controlling an image forming apparatus, the method comprising:
   receiving a plurality of jobs, wherein the plurality of jobs includes a first job and a second job which is received following the first job;
   suspending, in a case where a predetermined condition for execution of the first job is not satisfied, execution of the first job,
   determining if the first job is a job specified to require a user confirmation for execution of the job;
   starting, if it is determined that the first job is not the job specified to require the user confirmation for execution of the job and the second job is executable, execution of the second job based on elapse of a predetermined time period in a state that the predetermined condition is not satisfied, and
   not starting, if it is determined that the first job is the job specified to require the user confirmation for execution of the job, execution of the second job based on the elapse of the predetermined time period in a state that the predetermined condition is not satisfied even if the second job is executable.

7. A non-transitory computer readable storage medium storing a program for causing a computer to perform a method of controlling an image forming apparatus, the method comprising:
   receiving a plurality of jobs, wherein the plurality of jobs includes a first job and a second job which is received following the first job; and
   suspending, in a case where a predetermined condition for execution of the first job is not satisfied, execution of the first job;
   determining if the first job is a job specified to require a user confirmation for execution of the job;
   starting, if it is determined that the first job is not the job specified to require the user confirmation for execution of the job and the second job is executable, execution of the second job based on elapse of a predetermined time period in a state that the predetermined condition is not satisfied; and
   not starting, if it is determined that the first job is the job specified to require the user confirmation for execution of the job, execution of the second job based on the elapse of the predetermined time period in a state that the predetermined condition is not satisfied even if the second job is executable.

\* \* \* \* \*